(12) United States Patent
Stewart et al.

(10) Patent No.: US 12,225,328 B2
(45) Date of Patent: Feb. 11, 2025

(54) METHOD OF RETROFITTING A DATA COMMUNICATION SYSTEM TO A VEHICLE

(71) Applicant: SCC Worldwide LTD, Leeds (GB)

(72) Inventors: Joe Stewart, Leeds (GB); Peter Stone, Bradford (GB)

(73) Assignee: SCC WORLDWIDE LTD, Leeds (GB)

( * ) Notice: Subject to any disclaimer, the term of this patent is extended or adjusted under 35 U.S.C. 154(b) by 158 days.

(21) Appl. No.: 17/996,365

(22) PCT Filed: Apr. 15, 2021

(86) PCT No.: PCT/GB2021/050907
§ 371 (c)(1),
(2) Date: Oct. 17, 2022

(87) PCT Pub. No.: WO2021/209758
PCT Pub. Date: Oct. 21, 2021

(65) Prior Publication Data
US 2023/0199151 A1    Jun. 22, 2023

(30) Foreign Application Priority Data

Apr. 17, 2020    (GB) ..................................... 2005601

(51) Int. Cl.
*H04N 7/18*     (2006.01)
*B60R 16/023*   (2006.01)
*H02G 1/00*     (2006.01)

(52) U.S. Cl.
CPC ........... *H04N 7/183* (2013.01); *B60R 16/023* (2013.01); *H02G 1/005* (2013.01)

(58) Field of Classification Search
None
See application file for complete search history.

(56) References Cited

U.S. PATENT DOCUMENTS

| | | | | |
|---|---|---|---|---|
| 4,404,541 | A * | 9/1983 | Kodera ................. | G01S 15/931 367/909 |
| 4,937,796 | A * | 6/1990 | Tendler ................. | G01S 15/931 367/909 |
| 5,818,127 | A * | 10/1998 | Abraham ............ | H04L 25/0278 307/106 |
| 6,259,475 | B1 | 7/2001 | Ramachandran et al. | |

(Continued)

OTHER PUBLICATIONS

European Patent Office; International Search Report and Written Opinion for PCT/GB2021/050907; Jun. 17, 2021; entire document.

*Primary Examiner* — Muhammad Adnan
(74) *Attorney, Agent, or Firm* — ALLEN, DYER ET AL.

(57) ABSTRACT

A method and apparatus are disclosed for enabling an existing wire supplying DC current to an electrical load of a vehicle to serve as a clean line for transmission of a data signal without interference from electrical systems of the vehicle. The method comprises identifying opposite ends of the existing wire, cutting the wire at the opposite ends and inserting a respective inductor in series with the wire at each of the opposite ends, to define an intermediate wire section that extends between the two inductors, and coupling data transmitting and receiving units to the intermediate section of the wire to permit data transfer between the transmitting and receiving units.

9 Claims, 4 Drawing Sheets

(56) References Cited

U.S. PATENT DOCUMENTS

| | | | |
|---|---|---|---|
| 2002/0027496 A1* | 3/2002 | Cern | H04B 3/56 |
| | | | 340/310.17 |
| 2006/0125919 A1* | 6/2006 | Camilleri | H04N 7/188 |
| | | | 348/148 |
| 2010/0111201 A1 | 5/2010 | Sakai | |
| 2011/0096166 A1* | 4/2011 | Englander | H04N 7/183 |
| | | | 348/148 |
| 2011/0193961 A1* | 8/2011 | Peterson | H04N 7/183 |
| | | | 348/148 |
| 2016/0203721 A1* | 7/2016 | Wright | G08G 1/168 |
| | | | 348/118 |
| 2017/0021780 A1* | 1/2017 | Marafino | B60R 16/023 |
| 2017/0240125 A1 | 8/2017 | Weigert et al. | |

* cited by examiner

METHOD OF RETROFITTING A DATA COMMUNICATION SYSTEM TO A VEHICLE

CROSS-REFERENCE TO RELATED APPLICATIONS

This application is the § 371 National Stage Entry of International Application No. PCT/GB2021/050907, filed on Apr. 15, 2021, which claims the benefit of GB Application No. 2005601.6, filed on Apr. 17, 2020, the contents of which applications are herein incorporated by reference in their entirety.

FIELD OF THE INVENTION

The present invention relates to retrofitting of a data communication system to a vehicle, for example to permit transmission of a video signal from a camera to a monitor using existing vehicle wiring.

BACKGROUND OF THE INVENTION

Modern cars and commercial vehicles are currently regularly equipped with a reversing camera. A rear mounted video camera is activated when the reverse gear is engaged and transmits a video signal to a monitor mounted in the cab of the vehicle. This greatly improves safety when reversing, especially in the case of commercial vehicles.

When manufacturing a vehicle, it is possible to provide a dedicated shielded coaxial cable to carry a video signal but fitting such a coaxial cable to an existing vehicle would be very time consuming. Furthermore, in the case of an articulated commercial vehicle, it would require an additional connection to be provided between the cab and the trailer.

It is therefore desirable to transmit data signals, such as a video signal, over existing wires that provide DC current to electrical loads, such lights, at the rear of the vehicles. Several systems that transmit power and data over a common wire have been disclosed in the prior art, for example in US2017/0240125, US2011/00996166 and U.S. Pat. No. 6,259,475 amongst others. In known systems, a data signal, for example a video signal, is coupled into and out a DC power wire of the vehicle by way of decoupling capacitors and no modification is required to the vehicle wiring.

However, wires used in vehicles to transmit DC current to electrical loads are unshielded and bundled together to form a loom. When such wires are used to carry a video signal, they result in undesirable interference in the data signal as ignition and injector pulses generate noise on all wires in the wiring loom.

OBJECT OF THE INVENTION

The invention seeks therefore to modify an existing wire in a vehicle to create a clean line capable of carrying data signals without interference from the electrical system of the vehicle.

SUMMARY OF THE INVENTION

In accordance with a first aspect of the present invention, there is provided a method of enabling an existing wire supplying DC current to an electrical load of a vehicle to serve as a clean line for transmission of a data signal without interference from electrical systems of the vehicle, which method comprises identifying opposite ends of the existing wire, cutting the wire at the opposite ends and inserting a respective inductor in series with the wire at each of the opposite ends, to define an intermediate wire section that extends between the two inductors, and coupling data transmitting and receiving units to the intermediate section of the wire to permit data transfer between the transmitting and receiving units.

By placing inductors, also termed chokes, in series with DC current supply wire at both its ends, the method of the invention isolates an intermediate wire section from any high frequency interference inevitably present in the remainder of the vehicle wiring. This clean intermediate section is then used not only to transmit DC current to the load, but also as a transmission line for video signal or other data signals between the transmitting and receiving units.

The chokes in embodiments of the invention need to have a high current rating, as they must be able to conduct the current required by the electrical load, which may be 6 amps, or possibly more. To be effective in preventing high frequency signals from reaching the clean intermediate section of the wire used for data transmission, they are also required to have a high inductance value, typically 50 µH or more and preferably 100 µH or more. Because of both their size and their cost, no such chokes have been employed in the prior art to create a clean data transmission line and instead only DC decoupling capacitors were used between the DC power line and the data receiving and transmitting units.

The transmitting and receiving units also require access to electrical power and it would not be practicable to install special wiring for this purpose. It is therefore desirable instead that each of the transmission and receiving units derive its power directly from the same existing wire.

In some situations, for example if the wire used to carry video signals between the transmitting and receiving units is that leading to reversing lights, the data transmitting and receiving units need only be operational at times when power is being delivered by the existing wire to the electrical load.

However, it may in some situations be desirable to use an existing wire that is not live at the time that the data transmitting and receiving units are required to operate. In such a situation, the intermediate section of the wire may be connected to receive DC power even when the vehicle load is not activated, and data may be transmitted along the intermediate section to control a relay connecting the intermediate section to the vehicle load.

An advantage of the invention is that when a video system is fitted to an articulated vehicle, a connection between cab and trailer would be automatic, i.e. no driver input would be required to activate the video system, thereby providing a higher level of safety.

According to a second aspect of the invention, there is provided a data communication unit for connection within a break in a wire connecting a DC power source to an electrical load of a vehicle, which wire forms part of vehicle wiring that is subject to high frequency interference, the unit comprising a first connection terminal for connection to a first side of the break in the wire, a second connection terminal for connecting to the other side of the break in the wire, an inductor connected to the first and second connection terminals to re-establish electrical continuity of the wire and thereby permit flow of DC current to the load while preventing high frequency interference from passing between the two connection terminals, and a modem serving connected to one of the terminals to enable data communication with a second communication unit via a section of the wire that is isolated from remaining wiring of the vehicle by the inductor.

The data communication unit, which may be transmitter or a receiver, may further comprise a voltage regulator that is connected to one of the first and second connection terminals and serves to provide a stable DC voltage for powering the modem.

BRIEF DESCRIPTION OF THE DRAWINGS

The invention will now be described further, by way of example, with reference to the accompanying drawings, in which.

DETAILED DESCRIPTION OF THE DRAWINGS

Figure 1:
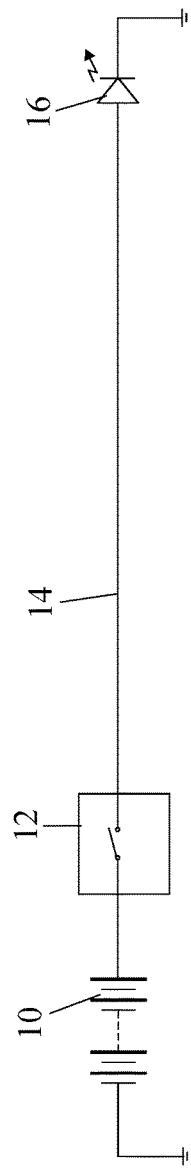
FIG. 1 shows a conventional circuit for powering a reversing light.

FIG. 1 shows wiring already present in any vehicle fitted with a re versing light. The vehicle battery 10, which is a 12V battery in most cars and vans but may be a 24V battery in larger commercial vehicles, is connected to a switch 12 associated with the gear selector. When reverse gear is selected, the switch 12 is closed and to send power over a wire 14 to the reversing light 16. The light 16 is shown in FIG. 1 as being an LED but it may alternatively be a filament bulb. In the case of an articulated vehicle, part of the wire 14 will be in the tractor and another part in the trailer, the wire 14 being included in an electrical connector for connecting the wiring of the trailer to the tractor.

Figure 2:
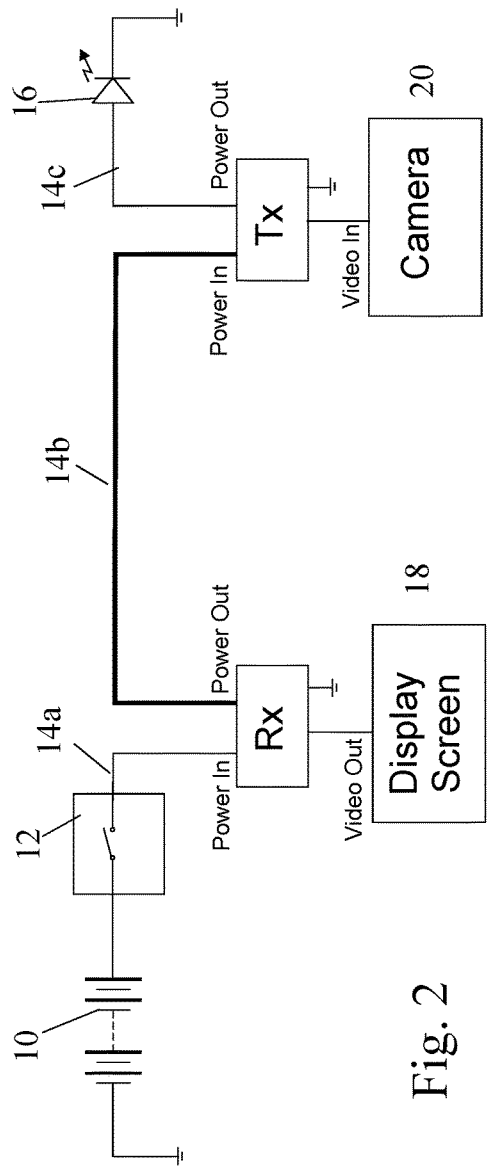
FIG. 2 shows the manner in which a video system may be installed in a vehicle using only the existing wiring shown in FIG. 1.

FIG. 2 shows how the existing wire 14 can be used to allow installation of a video system. The video system comprises a display screen 18 or monitor mounted in the cab to be visible to the vehicle driver and a camera 20 mounted at rear of the vehicle or the trailer.

A transmitting unit Tx, described in more detail below, is used to connect the camera 20 to the wire 14 at the rear of the vehicle, while a receiving unit Rx connects the display screen 18 to the front end of the wire.

In known systems, the transmitting and receiving units are coupled to the wire 14 by way of DC decoupling capacitors and the wire is not interrupted so that the DC supply path to the load remains undisturbed. By contrast, in the present invention, the wire 14 is cut and each of the transmitting and receiving units has two connection terminals, labelled Power In and Power Out, for connecting it in series with the wire 14. After the wire 14 is cut, each side of the cut is connected to a respective one of the two connection terminals.

In this way, the wire 14 is separated into three different sections, designated 14a, 14b and 14c. The connection of the intermediate section 14b to the sections 14a and 14c is by way of inductors, or chokes built, into the transmitting units Tx and Rx, each of the chokes being connected across the two connection terminals of its unit. The chokes will be described in more detail below with reference to FIGS. 3 and 4.

Each of the chokes allows a DC connection between the connection terminals of its unit but prevents high frequency signals from passing from one of the connection terminals to the other. As a result, while the sections 14a and 14c are connected to the remainder of the vehicle wiring and may carry interference signals, the section 14b, which is highlighted in the drawings, cannot receive interference signals and is sufficiently clean to carry a video signal from the camera 20 to the display screen 18 without significant signal degradation. All three sections 14a, 14b and 14c however remain at the same DC potential and allow DC power to be transmitted to the reversing light 16.

The construction of the transmitting unit will now be described with reference to FIG. 3. The Power In and Power Out connection terminal of FIG. 2 are shown in the top right corner or FIG. 3 and the inductor connected across the two connection terminals is designated L103. A first function of the transmission unit Tx is to pass DC voltage from connection terminal Power In to the connection terminal Power Out to supply DC current the reversing light and this take place through inductor L103.

A second function of the transmitting unit Tx is to send an amplitude modulated video signal to the receiving unit via the connection terminal Power In. This signal is generated in the modem block 110 shown at the bottom left side of FIG. 3. The modem block 110 receives a signal from the video camera 20 via the terminal designated Video In, which is applied via a capacitor C107 to an integrated circuit U101.

The integrated circuit (IC) U101 is a video modulator/demodulator LA727910V that is commercially available from ON Semiconductor and is used in door intercom systems. The IC U101 produces on an output pin connected in FIG. 3 to a capacitor C102 an analog signal of predetermined carrier frequency that is amplitude modulated in accordance with the image viewed by the camera and applies it to the connection terminal Power In leading to the receiving unit RX. The resistors R101 and R104 and the capacitors C101, C103, C104, C105 and C106 are as specified by the manufacturer of IC U101 to establish the required voltages and impedances at the various pins of the integrated circuit. The diode D101 is a transient voltage suppressor, provided to safeguard against spurious voltage spikes.

It should be clear to the person skilled in the art that alternative modulator/demodulator IC's may be used in the modem block 110 and that the surrounding circuitry will be dependent on the selected IC.

Figure 3:
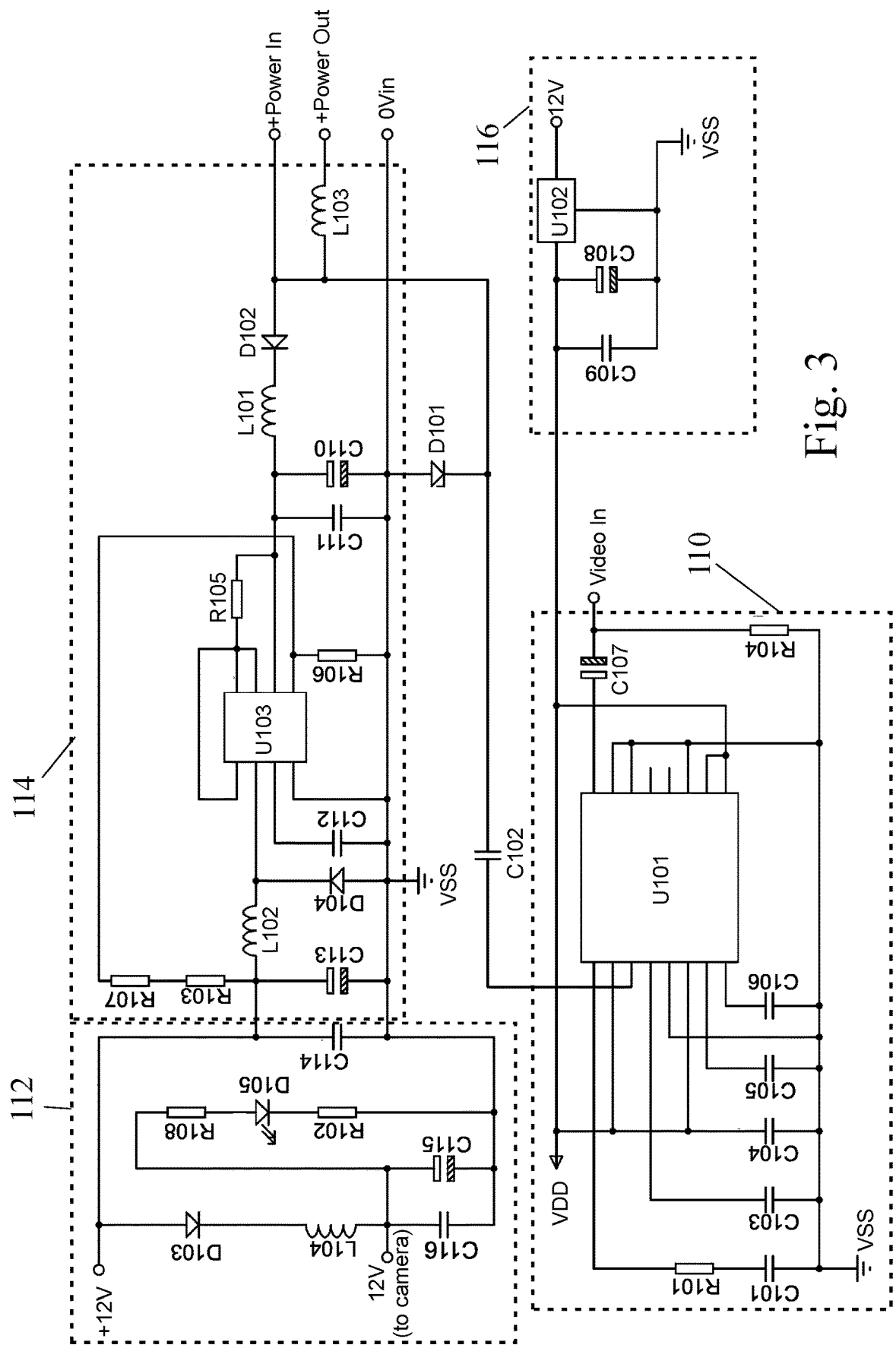
FIG. 3 is a detailed circuit diagram of the transmitting unit Tx in FIG. 2.

All the remaining circuitry in FIG. 3 serves mainly to provide the DC power required by the modem block 110. The IC component U103 of the block designated 114 is a buck, or step down, regulator that is required in a vehicle with a 24V battery to provide stable 12V. Together with resistors R103, R105 and R106, inductors L101 and 102, diodes D102 and D104 and capacitor C110, C11, C112 and C113 a stable 12V supply is developed across the capacitor C114.

The block 112 has two 12V output supply terminals. The one at the top left hand side of the drawing provides power to the modem block 110 while the second supplies the camera and is further smoothed by diode D103, inductor L104 and capacitors C115 and C116. An LED D105 connected across the capacitor C115 by resistors R102 and R108 serves only to indicate that power is available to the camera 20 and the modem block 110.

The modem block 110 requires a supply voltage not of 12V but of 5V. The block 116 shown at the bottom right of FIG. 3 receives 12V and uses a regulator IC U102 and two capacitors C108 and C109 to provide the 5V supply VDD that is applied to the modem block 110.

Figure 4:
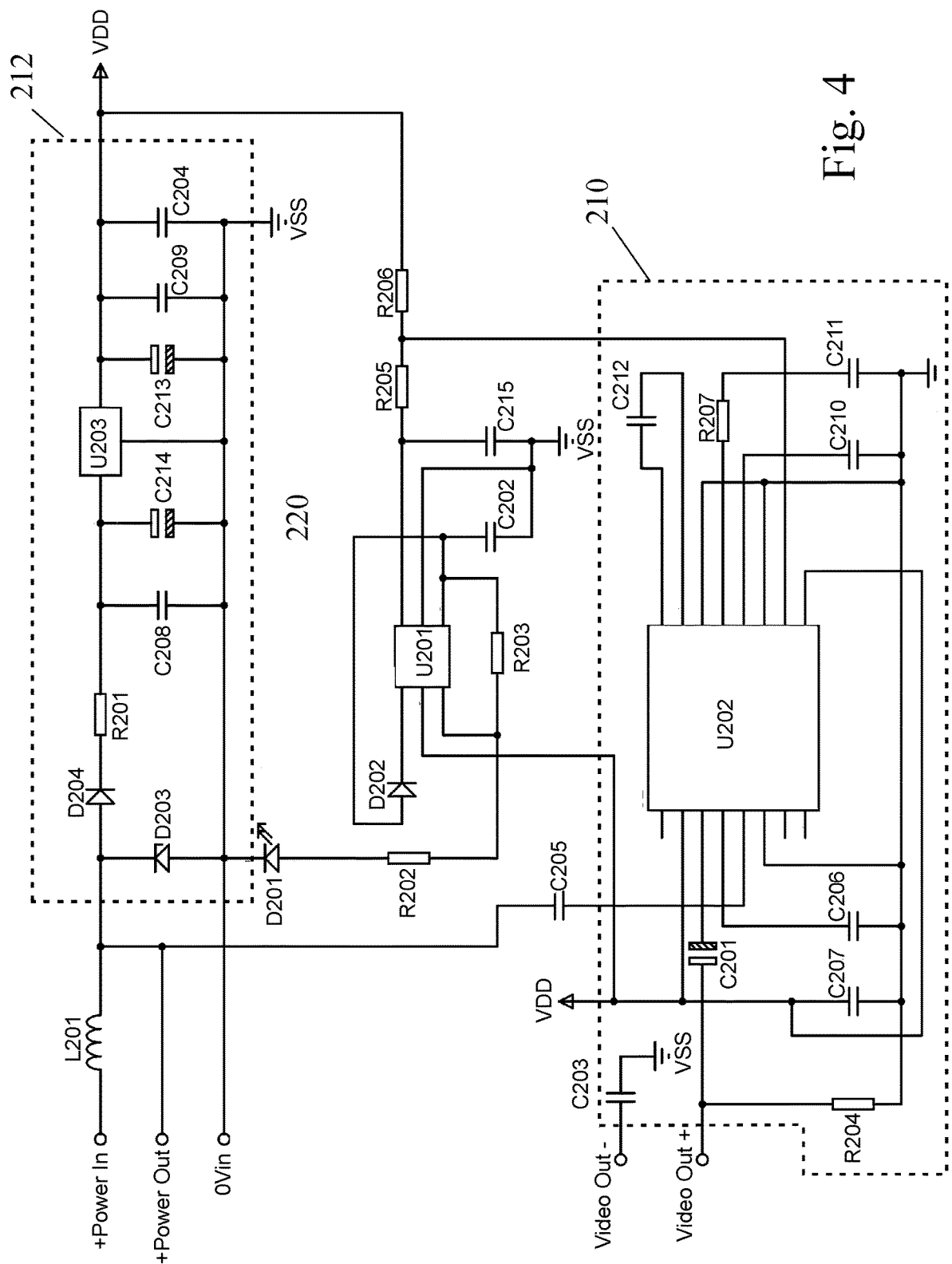
FIG. 4 is a detailed circuit diagram of the receiving unit Rx in FIG. 2, and, FIG. 5 is a diagram similar to that of FIG. 2 showing the installation of a video system in a circuit where the load need not be powered at the time that the video system is in operation.

The receiving unit Rx of FIG. 2 is shown in FIG. 4. Here, the Power In and Power Out terminal connectors are shown at the top left side of the drawing and are connected to one another by an inductor L201. The components within the block 210 act as a demodulator. The IC U202 may be the same as the IC U201 of the transmitting unit, albeit configured differently.

The Power Out connection terminal, which receives an amplitude modulated carrier frequency from the transmitting unit Tx applies the RF component of the incoming signal to a terminal of the IC U202 by way of capacitor C205. This results in the IC U202 producing a video output signal that is transmitted to the display unit via the capacitor C201. The remaining components within the demodulator block 210 are specified by the manufactured of the IC U202 and will depend on the choice of IC. In FIG. 4, these components are resistors R204 and R207 and capacitor C206, C207, C210, C211 and C212. A second Video Out terminal is connected to a virtual ground VSS via a capacitor C203.

The block 212 in the top right hand side of the drawing is a voltage regulator using a linear voltage regulating IC U203, capacitors C208, C214, C213, C209 and C204. The voltage regulator is connected to receive the DC component of the voltage on the connection terminal Power Out by way of a diode D204 and a resistor R201. A transient voltage suppressor D203 is provided to protect the circuitry of the receiving unit Rx from voltage spikes on the Power In terminal.

The remaining circuity is to provide an indication via an LED D201 that there is power and that there is a received video signal. The IC U201 is a dual Schmitt-trigger inverter that powers the LED D201 to flash when power is present and to remain on constantly when a modulated carrier signal is received from the transmitter unit Tx. The IC U201 has different pins connected to the IC 202 and to the VDD power line, its remaining pins being connected to resistors R203, R205 and R206, capacitors C202 and C215, diode D202 and to the LED D201 by way of resistor R202.

In FIG. 2, it is assumed that DC power is always supplied to the drive load (the reversing light 16) when the video system is to be operated. This however is not essential and in FIG. 5 the video system may operate when no power is supplied to the driven load.

Figure 5:
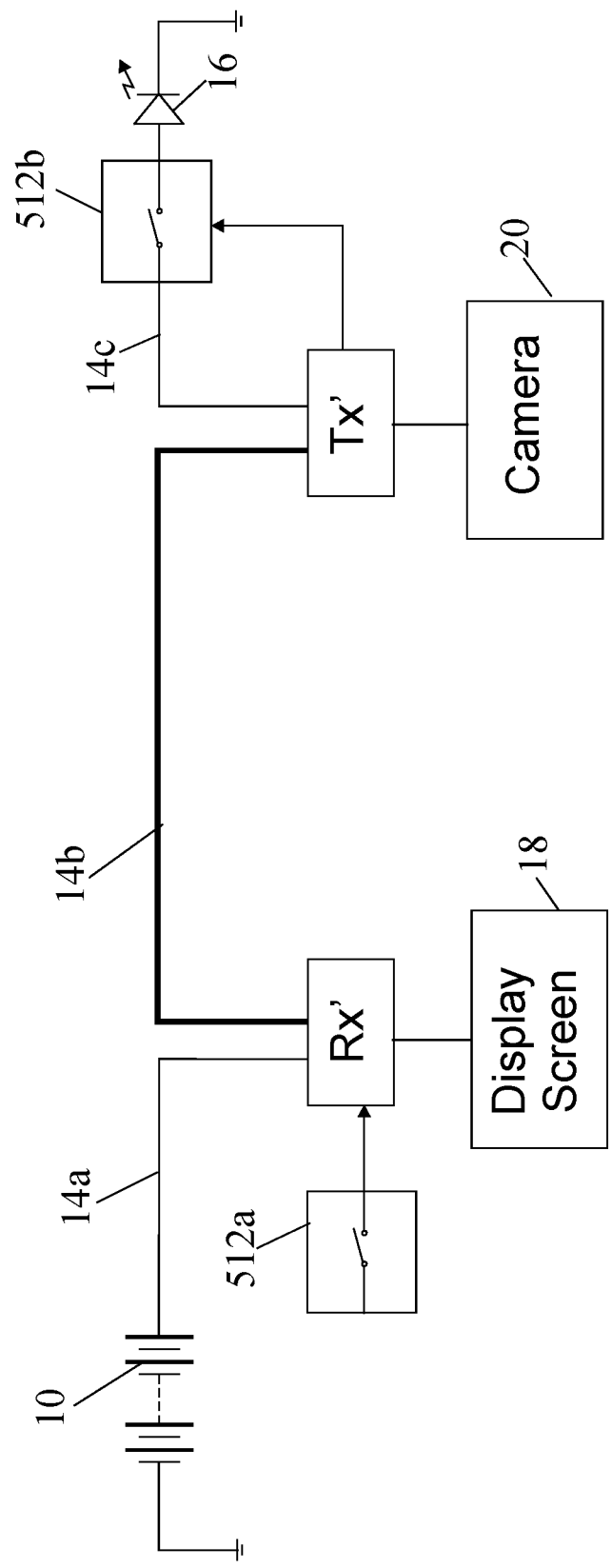

The embodiment of FIG. 5 differs from that of FIG. 2 in that a switch 512a for operating the load is not connected in series with the load but to a modified receiver unit Rx'. The modified receiver unit Rx' can now transmit a signal encoded onto a carrier to a modified transmitting unit Tx' which on receipt of the encoded signal activates an electronic switch or relay 512b to apply power to the driven load 16. The video system can in this case be operated at all times and power sent to the drive load on demand.

While the invention has been described above by reference to transmission of a video signal over existing vehicle wiring, it may be used for other data signals that require a clean line to avoid the data from being corrupted by interference from other systems installed in the vehicle, such as ignition or fuel injection systems.

The invention claimed is:

1. A method of enabling an existing wire supplying DC current to an electrical load of a vehicle to serve as a clean line for transmission of a data signal without interference from electrical systems of the vehicle, the method comprising:
   identifying a first end and an opposing second end of the existing wire;
   cutting the existing wire at the first and second ends to separate the existing wire into a first section, an intermediate section, and a third section;
   inserting a first inductor in series with a proximal end of the intermediate section of the existing wire and inserting a second inductor in series with a distal end of the intermediate section of the existing wire, whereby the DC current supplied via the existing wire from the first section to the electrical load at the third section passes through the first and second inductors that are configured to prevent high frequency signals from passing through the intermediate section, in order to provide the clean line for transmission; and
   coupling a data transmitting unit between the third section and the distal end of the intermediate section, and coupling a receiving unit between the proximal end of the intermediate section and the first section to permit data transfer between the transmitting and receiving units using the intermediate section.

2. The method as claimed in claim 1, wherein each of the transmitting and receiving units derives dc power from the existing wire.

3. The method as claimed in claim 2, wherein the transmitting and receiving units are only operational at times when power is delivered by the existing wire to the electrical load.

4. The method as claimed in claim 2, wherein the intermediate section of the wire is connected to receive DC power even when no DC current is to be supplied to the vehicle load and the transmitting and receiving units serve additionally to control a switching device for activating the vehicle load.

5. The method as claimed in claim 1, wherein the transmitting unit is connected to receive a composite video analogue signal from a camera and to modulate the analogue signal onto the carrier and the receiving unit is connected to a monitor in order to display the image captured by the camera.

6. A communication unit for connection within a break in a wire connecting a DC power source to an electrical load of a vehicle, which wire forms part of vehicle wiring that is subject to high frequency interference, the communications unit comprising:
   a first connection terminal for connection to an upstream side of the break in the wire;
   a second connection terminal for connecting to a downstream side of the break in the wire;
   an inductor coupled between the first and the second connection terminals, the inductor is configured to re-establish electrical continuity of the wire and thereby permit flow of DC current to the electrical load while preventing high frequency interference from passing between the first and second connection terminals to the downstream side of the break; and
   a modem coupled to one of the terminals to enable data communication with a second communication unit via a section of the wire downstream from the break that is isolated from an upstream section of the wiring of the vehicle by the inductor.

7. The communication unit as claimed in claim 6, further comprising a voltage regulator that is connected to one of the first and second connection terminals and serves to provide a stable DC voltage for powering the modem.

8. The communication system as claimed in claim 6, wherein the inductor has a current rating in excess of 6A and an inductance value greater than 50 µH.

9. The communication system as claimed in claim 8, wherein the inductor has an inductance value greater than 100 µH.

* * * * *